July 15, 1958 — R. E. VAUGHN — 2,843,427
HUB CAP
Filed Jan. 4, 1957
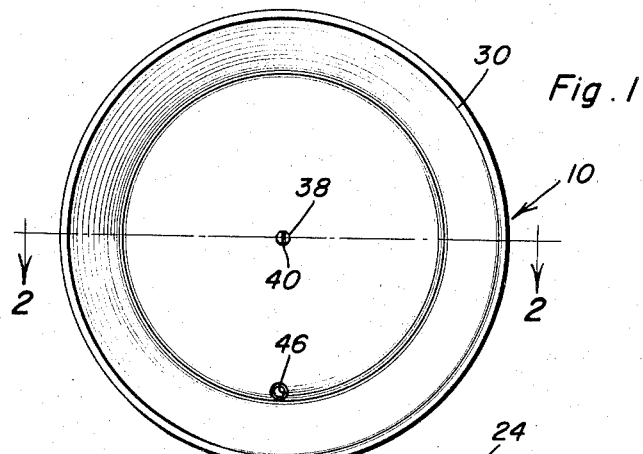
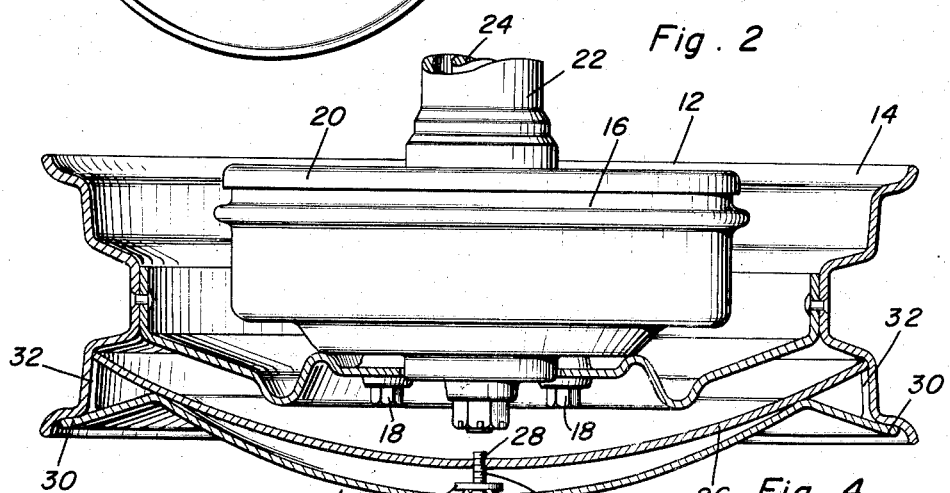
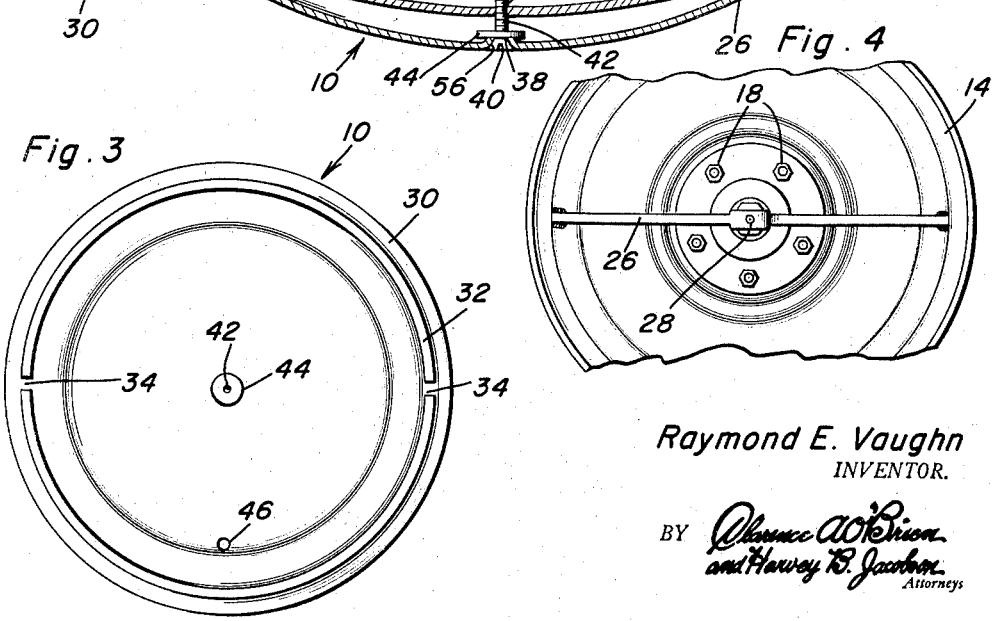
Raymond E. Vaughn
INVENTOR.

United States Patent Office
2,843,427
Patented July 15, 1958

2,843,427

HUB CAP

Raymond E. Vaughn, Mulhall, Okla., assignor of twenty-five percent to George C. Chiga and twenty-five percent to Sam J. Bell, both of Guthrie, Okla.

Application January 4, 1957, Serial No. 632,466

1 Claim. (Cl. 301—37)

This invention relates in general to automobile accessories and more particularly to an improved hub cap and retaining means therefor. The primary object of this invention is to provide an automobile hub cap which may be easily installed and removed from the wheel without need of special tools.

A further object of this invention is to provide a vehicle hub cap which, after installation on the vehicle wheel will not rotate relative thereto and will not be accidentally dislodged therefrom.

A still further object of this invention is to provide a neat ornamental hub cap for vehicles having a minimum number of working parts.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in elevation of the outer surface of the hub cap;

Figure 2 is a sectional plan view, taken substantially along section line 2—2 of Figure 1, and showing the hub cap attached to a vehicle wheel, which is also in section, with the wheel attached to a vehicle brake drum by means of lug nuts, the backing plate, axle housing and axle also being shown;

Figure 3 is a view in elevation of the inside of the hub cap; and

Figure 4 is a side elevation of a vehicle wheel with the mounting strap of the hub cap shown attached thereto and parts of the wheel broken away.

Referring now to the drawings in detail, it will be noted that the hub cap, which is referred to in general by the reference numeral 10, is mounted on a vehicle wheel 12 having an outer drop-center type rim 14. The wheel 12 is retained on a brake drum 16 by means of lugs and lug nuts 18. The standard parts, such as the backing plate 20, the axle housing 22 and the axle 24 are also shown in Figure 2.

As will be noted in Figure 4 a mounting strap 26, formed of strap metal, is attached at diametrically opposite points on the rim 14. The strap 26 is bowed outward away from the wheel structure 12 in an arcuate manner and is provided with a threaded aperture 28 at the center thereof. The aperture 28 is concentric with the rim 14.

The hub cap 10, which is dished outward, when mounted on the vehicle wheel engages the wheel rim 14 at an outer extremity 30 and is further provided with an inwardly projecting flange 32 having diametrically opposed notches 34 therein. The notches 34 are of slightly greater dimension than the strap 26 and when the hub cap is assembled on the wheel the notches engage the strap and thus prevent relative rotation between the hub cap and the wheel. A concentric tapered aperture 56 is provided in the center of the hub cap 10 which has disposed therein a flat headed machine screw 38 having a screwdriver slot 40 in the head thereof. The machine screw 38 projects through the hub cap and is provided with a threaded portion 42 on the inner end thereof. It will be noted that a washer 44 is secured to the screw 38 immediately adjacent the inner surface of the hub cap. The washer 44 thus retains the screw 38 in the hub cap 10 regardless of whether the hub cap is mounted or not. It should be understood that this prevents the accidental loss of the screw 38. The hub cap 10 is also provided with a valve stem access opening 46, which may be eliminated if an unbroken, ornamental surface is desired. The hub cap would then be removed for inflation of the tire.

Although the method of assembly and disassembly should be apparent from the foregoing description, a brief description of the assembly and disassembly follows: Assuming that the strap 26 has been welded or suitably attached to the wheel rim 14 the hub cap 10 is placed in alignment with the final assembled position, that is, with valve stem opening 46 in alignment with the valve stem and the notches 34 in alignment with the strap 26, the screw 38 in approximate alignment with the aperture 28, a screwdriver blade then being inserted into the screwdriver slot 40 and the screw 38 tightened in threaded aperture 28 thus drawing the hub cap into position. The reverse procedure is utilized in removing the hub cap.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In combination with a vehicle wheel and its outer rim, said wheel rim having a circular outwardly projecting flange, an outwardly bowed strap secured to the wheel rim and having a central threaded aperture therein, a hub cap adapted to be placed over said strap, said hub cap having an outwardly convex central portion with a circular crease portion defining this central portion, and an outwardly projecting ring portion beginning at said circular crease portion, the outer periphery of said ring portion being in contact with said wheel rim, a concentric aperture in said hub cap in overlying relation to said threaded aperture, means passing through said aperture and into said threaded aperture for retaining said hub cap in position on the rim, said retaining means including a bolt and a washer secured to said bolt, said washer rotatably retaining said bolt in said aperture, means on said hub cap for preventing relative rotation between said wheel and said hub cap, said rotation prevention means including an inwardly projecting concentric flange having diametrically opposed notches therein, said notches engaging the outer ends of said strap when the hub cap is installed, said inwardly projecting concentric flange being in contact with said outwardly projecting wheel flange, said crease portion being provided with points of contact with said strap located in spaced relation to the outer edges of said strap.

References Cited in the file of this patent

UNITED STATES PATENTS 2,669,487    Horn _____ Feb. 16, 1954

FOREIGN PATENTS 422,770    Great Britain _____ Jan. 17, 1935
462,025    Great Britain _____ Feb. 16, 1937